United States Patent
Sharma et al.

(10) Patent No.: US 7,446,939 B2
(45) Date of Patent: Nov. 4, 2008

(54) OPTICAL DIFFUSER WITH UV BLOCKING COATING USING INORGANIC MATERIALS FOR BLOCKING UV

(75) Inventors: Pramod K. Sharma, Ann Arbor, MI (US); Desaraju V. Varaprasad, Ann Arbor, MI (US); Thomas J. Taylor, Northville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 314 days.

(21) Appl. No.: 11/324,758

(22) Filed: Jan. 4, 2006

(65) Prior Publication Data

US 2007/0148601 A1  Jun. 28, 2007

Related U.S. Application Data

(63) Continuation-in-part of application No. 11/314,735, filed on Dec. 22, 2005.

(51) Int. Cl.
G02B 5/02 (2006.01)

(52) U.S. Cl. ............ 359/599; 359/361; 362/355

(58) Field of Classification Search ............ None
See application file for complete search history.

(56) References Cited

U.S. PATENT DOCUMENTS

| | | | |
|---|---|---|---|
| 2,726,965 A | 12/1955 | Cressman et al. | |
| 3,148,300 A * | 9/1964 | Graff | 313/112 |
| 3,459,574 A | 8/1969 | Willcox et al. | |
| 3,531,677 A | 9/1970 | Loughridge | |
| 4,353,991 A | 10/1982 | Van Ness et al. | |
| 4,381,333 A | 4/1983 | Beggs et al. | |
| 4,390,636 A | 6/1983 | Votava | |
| 4,441,046 A | 4/1984 | James | |
| 5,196,088 A | 3/1993 | Soda | |
| 5,246,540 A | 9/1993 | Soda | |
| 5,306,674 A | 4/1994 | Ruderer et al. | |
| 5,332,618 A | 7/1994 | Austin | |
| 5,371,138 A | 12/1994 | Schaefer et al. | |
| 5,725,919 A | 3/1998 | Roberts et al. | |
| 5,725,957 A | 3/1998 | Varaprasad et al. | |
| 5,949,506 A | 9/1999 | Jones et al. | |
| 6,040,372 A | 3/2000 | Watanabe et al. | |

(Continued)

FOREIGN PATENT DOCUMENTS

DE  20 2006 002 057   4/2006

(Continued)

OTHER PUBLICATIONS

U.S. Appl. No. 11/229,837, filed Sep. 20, 2005.

(Continued)

Primary Examiner—Arnel C Lavarias
(74) Attorney, Agent, or Firm—Nixon & Vanderhye P.C.

(57) ABSTRACT

A diffuser is provided in an illumination system, where the diffuser is capable of blocking significant amounts of ultraviolet (UV) radiation. In certain example embodiments, the diffuser includes a glass substrate which supports a UV coating(s) that blocks significant amounts of UV radiation thereby reducing the amount of UV radiation which can make its way through the diffuser. In certain example embodiments, the coating may include inorganic particulate in a fit matrix so that the coating may both diffuse visible light and perform UV blocking.

19 Claims, 7 Drawing Sheets

U.S. PATENT DOCUMENTS

| | | | |
|---|---|---|---|
| 6,093,749 | A | 7/2000 | Watanabe et al. |
| 6,149,888 | A | 11/2000 | Ota et al. |
| 6,164,785 | A | 12/2000 | Mackawa |
| 6,180,224 | B1 | 1/2001 | Shouji et al. |
| 6,376,066 | B1 | 4/2002 | Kanzaki et al. |
| 6,384,526 | B1 * | 5/2002 | Peters ..................... 313/493 |
| 6,521,677 | B2 | 2/2003 | Yashiro et al. |
| 6,573,961 | B2 | 6/2003 | Jiang et al. |
| 6,649,212 | B2 | 11/2003 | Payne et al. |
| 6,686,047 | B2 | 2/2004 | Yamaguchi et al. |
| 6,723,423 | B1 | 4/2004 | Kaneko et al. |
| 6,831,027 | B2 | 12/2004 | Gazo |
| 6,896,934 | B2 | 5/2005 | Aronica et al. |
| 6,924,037 | B1 | 8/2005 | Joret et al. |
| 6,934,080 | B2 | 8/2005 | Saccomanno et al. |
| 6,940,665 | B2 | 9/2005 | Cowan et al. |
| 6,942,906 | B2 | 9/2005 | Sakata et al. |
| 6,943,342 | B2 | 9/2005 | Bechtel et al. |
| 6,952,507 | B2 | 10/2005 | Johnson et al. |
| 6,963,380 | B1 | 11/2005 | Kwon et al. |
| 6,963,445 | B2 | 11/2005 | Hoover et al. |
| 6,963,688 | B2 | 11/2005 | Nath |
| 2003/0146680 | A1 | 8/2003 | Wei |
| 2003/0165675 | A1 | 9/2003 | Marzolin et al. |
| 2003/0214812 | A1 | 11/2003 | Bourdelais et al. |
| 2004/0228141 | A1 | 11/2004 | Hay et al. |
| 2005/0105186 | A1 | 5/2005 | Kaminsky et al. |
| 2005/0189524 | A1 | 9/2005 | Weng et al. |
| 2006/0176429 | A1 | 8/2006 | Watchi et al. |
| 2007/0064446 | A1 | 3/2007 | Sharma et al. |
| 2007/0153389 | A1 * | 7/2007 | Sharma et al. .............. 359/599 |

FOREIGN PATENT DOCUMENTS

WO     WO 02/37568     5/2002

OTHER PUBLICATIONS

U.S. Appl. No. 11/314,735, filed Dec. 22, 2005.
U.S. Appl. No. 11/324,756, filed Jan. 4, 2006.
International Search Report dated May 31, 2007.

* cited by examiner

| Examples | Frit 99 by wt% | Ingredient 1 by Wt% | Oxide by wt% | Thickness (μm) | Tvis (%) | Tuv (%) | b* |
|---|---|---|---|---|---|---|---|
| Example #1 | 99 | 1 CeO₂ colloids | 0.2 CeO₂ | 4.8 | 38.5 | 2.3 | 17.6 |
| Example #2 | 99.8 | 0.2 ZnO colloids | 0.08 ZnO | 1.8 | 59.6 | 27.1 | 2.8 |
| Example #3 | 90 | 10 TiO₂ colloids | 3 TiO₂ | 7.6 | 46.1 | 2.2 | 9.4 |

| Example | Frit 99 by wt% | Ingredients 1 by wt% | Oxide by wt% | Ingredients 2 by wt% | Oxide by wt% | Thickness (μm) | Tvis (%) | Tuv (%) | b* |
|---|---|---|---|---|---|---|---|---|---|
| Example #4 | 91.9 | 8 TiO₂ colloids | 2.4 TiO₂ | | 0.1 Nb₂O₅ | 6.9 | 42.5 | 3.5 | 4.8 |
| Example #5 | 91.8 | 8 TiO₂ colloids | 2.4 TiO₂ | | 0.2 Co₃O₄ | 7.0 | 41.3 | 6.5 | 4.1 |
| Example #6 | 97.4 | 2 ZnO colloids | 0.08 ZnO | 0.6 TiO₂ colloids | 1.6 TiO₂ | 4.8 | 59.7 | 37.9 | 1.5 |
| Example #7 | 97.2 | 2 ZnO colloids | 0.08 ZnO | 0.8 TiO₂ colloids | 2.4 TiO₂ | 5.7 | 48 | 6.9 | 4.7 |
| Example #8 | 90.2 | 8 TiO₂ colloids | 3 TiO₂ | | 0.1 SiO₂ | 2.3 | 46.1 | 2.2 | 9.4 |
| Example #9 | 90.3 | 2 ZnO colloids | | 7 TiO₂ 0.7 Al₂O₃ | 0.21wt % TiO₂ 0.7 Al₂O₃ | 6.6 | 46.3 | 5.6 | 4.3 |

| Example | Mesh size | Thickness (μm) | Tvis (%) | Tuv (%) | b* |
|---|---|---|---|---|---|
| Example #3 | 140 | 6.6 | 46.3 | 5.6 | 4.3 |
| Example #10 | 158 | 6.4 | 48.2 | 1.2 | 10 |
| Example #11 | 380 | 3.8 | 57.4 | 5.2 | 8.4 |

| Example | Mesh size | Thickness (μm) | Tvis (%) | Tuv (%) | b* |
|---|---|---|---|---|---|
| Example #9 | 140 | 7.6 | 46.1 | 2.2 | 9.4 |
| Example #12 | 158 | 6.3 | 53.6 | 3.9 | 8 |
| Example #13 | 280 | 5.2 | 63 | 9 | 5.2 |

OPTICAL DIFFUSER WITH UV BLOCKING COATING USING INORGANIC MATERIALS FOR BLOCKING UV

This application is a continuation-in-part (CIP) of U.S. Ser. No. 11/314,735, filed Dec. 22, 2005, entitled Optical Diffuser with UV Blocking Coating, the entire disclosure of which is hereby incorporated herein by reference.

This invention relates to a diffuser for use in optical devices. In certain example embodiments, the diffuser includes both diffusing functionality and a coating for blocking substantial amounts of ultraviolet (UV) radiation. Inorganic UV blocking material may be mixed with a frit (e.g., glass frit) matrix in certain example embodiments of this invention, to make up the UV blocking coating.

BACKGROUND OF THE INVENTION

Diffusers are known in the art. Diffusers are for widely scattering and/or spreading light, and are used in many different optical application including but not limited to wrist watches, projection systems, displays, computer screens, surgical equipment, optical communication systems, light sensors, fiber optic systems, microscope illumination systems, light guides, and so forth. Ultraviolet (UV) radiation can damage one or more of the aforesaid devices in which diffusers may be used. However, unfortunately, conventional diffusers do not block sufficient ultraviolet (UV) radiation which can lead to damage in one or more of the aforesaid optical devices.

Accordingly, it has been found that there exists a need in the art for a diffuser that can both function as a diffuser and block significant amounts of UV radiation.

Additionally, it has been found that certain organic UV coatings (with substantial organic UV blockers) are undesirable in that they are not heat resistant, and cannot withstand the high temperatures associated with thermal tempering of glass substrates. In particular, such organic UV blockers may undergo decomposition at high temperatures. Such organic UV coatings also suffer from a lack of mechanical durability, and thus are susceptible to yield loss. Moreover, in certain applications where a diffuser or organic coating thereon is subjected to high operating temperatures over prolonged times, organic based coatings tend to exhibit discoloration.

Thus, it will be appreciated that there also exists a need in the art for a high temperature resistant UV coating that is mechanically durable, and is capable of withstanding the high temperatures (e.g., from about 580 to 800 degrees C.) associated with thermal tempering of glass substrates.

BRIEF SUMMARY OF EXAMPLE EMBODIMENTS OF THE INVENTION

A diffuser is provided in an illumination system, where the diffuser is capable of blocking significant amounts of UV radiation. In certain example embodiments of this invention, the diffuser includes a glass substrate which supports a UV coating(s) that blocks significant amounts of UV radiation thereby reducing the amount of UV radiation which can makes its way through the diffuser. Optionally, the UV blocking coating may also perform a light diffusing function.

In certain example embodiments of this invention, a diffuser includes a glass substrate which has a UV coating thereon. Optionally, the UV coating may be provided on one side of the glass substrate and a diffusing coating on the other side of the glass substrate. In another example embodiment, a single coating provides both UV blocking and light diffusing functions. In another example embodiment of this invention, a diffuser includes a glass substrate including a roughened (e.g., roughened by etching or the like) surface for diffusing light, and a UV coating provided on the glass substrate over the roughened surface. In still further example embodiments of this invention, a diffuser includes a glass substrate including a roughened (e.g., roughened by etching or the like) surface for diffusing light, and a UV coating provided on the major surface of the glass substrate opposite the roughened surface. The UV coating functions to block (absorb and/or reflect) significant amounts of UV radiation.

In certain example embodiments of this invention, the UV coating formulation is based on the incorporation of UV blockers (e.g., UV absorbing materials) into a high temperature curable glassy matrix such as a glass inclusive frit. Example heat resistant UV blockers which may be used in the glassy matrix include inorganic oxides of metals such as Ce, Zn, Bi, Ti, Sn and/or Sb. Surprisingly, it has been found that the use of such inorganic UV blockers in a glassy matrix such as frit results in a UV coating that is highly mechanically durable, heat resistant, and capable of going through a thermal tempering process along with the supporting glass substrate without significant degradation. In certain example embodiments, the UV coating is capable of withstanding the high temperatures (e.g., from about 580 to 800 degrees C.) associated with thermal tempering of the supporting glass substrate without significant degradation in UV blocking or transmission characteristics, thereby providing a temperable glass based diffuser.

Diffusers according to certain example embodiments of this invention may be used in an illumination system in any suitable optical application, including but not limited to applications such as wrist watches, projection systems, display backlights, computer screens, surgical equipment, optical communication systems, light sensors, fiber optic systems, microscope illumination systems, and light guides.

In certain example embodiments of this invention, there is provided an illumination system comprising: a light source for emitting light, the light emitted from the light source including at least visible light and ultraviolet (UV) radiation; a diffuser positioned so as to receive light from the light source, the diffuser diffusing visible light received from the light source; and wherein the diffuser comprises a glass substrate that supports a UV blocking coating, so that the diffuser has a $T_{UV}$ (UV transmission) of no greater than about 20%, and wherein the UV blocking coating comprises inorganic oxide(s) of one or more of Ce, Zn, Bi, Ti, Sn and/or Sb in a glass frit.

In certain example embodiments of this invention, the UV blocking coating comprises, by weight, from about 0.1 to 10% (or from about 0.1 to 5%) of the inorganic oxide(s) of one or more of Ce, Bi, Ti, Sn and/or Sb.

In certain example embodiments of this invention, there is provided an optical diffuser for use in an illumination system, the optical diffuser comprising: a glass substrate that supports a UV blocking coating, wherein the diffuser has a $T_{UV}$ (UV transmission) of no greater than about 20%, and wherein the UV blocking coating comprises at least one inorganic metal oxide for blocking significant amounts of UV radiation, and wherein the at least one inorganic metal oxide is provided in a frit.

DETAILED DESCRIPTION OF EXAMPLE EMBODIMENTS OF THE INVENTION

Referring now more particularly to the figures where like reference numerals indicate like parts throughout the several views.

This invention relates to a diffuser for use in illumination systems for optical devices/systems. A diffuser is provided that both functions as a diffuser and blocks significant amounts of UV radiation. In certain example embodiments of this invention, the diffuser includes a glass substrate which supports a UV coating(s) 10 that blocks significant amounts of UV radiation thereby reducing the amount of UV radiation which can makes its way through the diffuser. Because the diffuser blocks significant amounts of UV radiation, the amount of UV radiation making its way through the diffuser and into the active area of the optical device is reduced thereby reducing the amount of potential damage which can be inflicted on the optical device by the UV radiation. For example, UV radiation tends to cause certain materials to degrade thereby reducing the lifespan of one or more of the optical devices mentioned herein. Diffusers according to certain example embodiments of this invention thus provide for blockage of significant amounts of UV radiation while retaining adequate transmission of light in the visible region/range.

Diffusers according to certain example embodiments of this invention (see FIGS. 1-5) may be used in any suitable optical application, including but not limited to applications such as wrist watches, projection systems, display (e.g., liquid crystal display) backlights, computer screens, surgical equipment, optical communication systems, light sensors, fiber optic systems, microscope illumination systems, and light guides. In certain example embodiments of this invention, the diffuser is a glass based product that can both block (reflect and/or absorb) significant amounts of UV radiation and provide glare reduction from one or both surfaces. In certain example embodiments, the diffuser may act as a Lambertian or quasi-Lambertian diffuser.

Plastic diffusers have been known in the art. However, plastic based diffusers may be susceptible to high temperatures (e.g., high operating temperatures) associated with one or more of the aforesaid optical devices. Thus, in certain example non-limiting embodiments of this invention, the diffuser includes a glass substrate 1 which is more durable and can withstand high temperature applications and which does not degrade upon UV exposure.

In certain example embodiments of this invention, the UV coating 10 formulation is based on the incorporation of UV blockers (e.g., UV absorbing materials) into a high temperature curable glassy matrix such as a glass inclusive frit. Example heat resistant UV blockers which may be used in the glassy matrix include inorganic oxides of one or more of Ce, Zn, Bi, Ti, Sn and/or Sb. Surprisingly, it has been found that the use of such inorganic UV blockers in a glassy matrix such as frit results in a UV coating that is highly mechanically durable, heat resistant, and capable of going through a thermal tempering process along with the supporting glass substrate without significant degradation. In certain example embodiments, the UV coating is capable of withstanding the high temperatures (e.g., from about 580 to 800 degrees C.) associated with thermal tempering of the supporting glass substrate without significant degradation in UV blocking or transmission characteristics.

Figure 1:
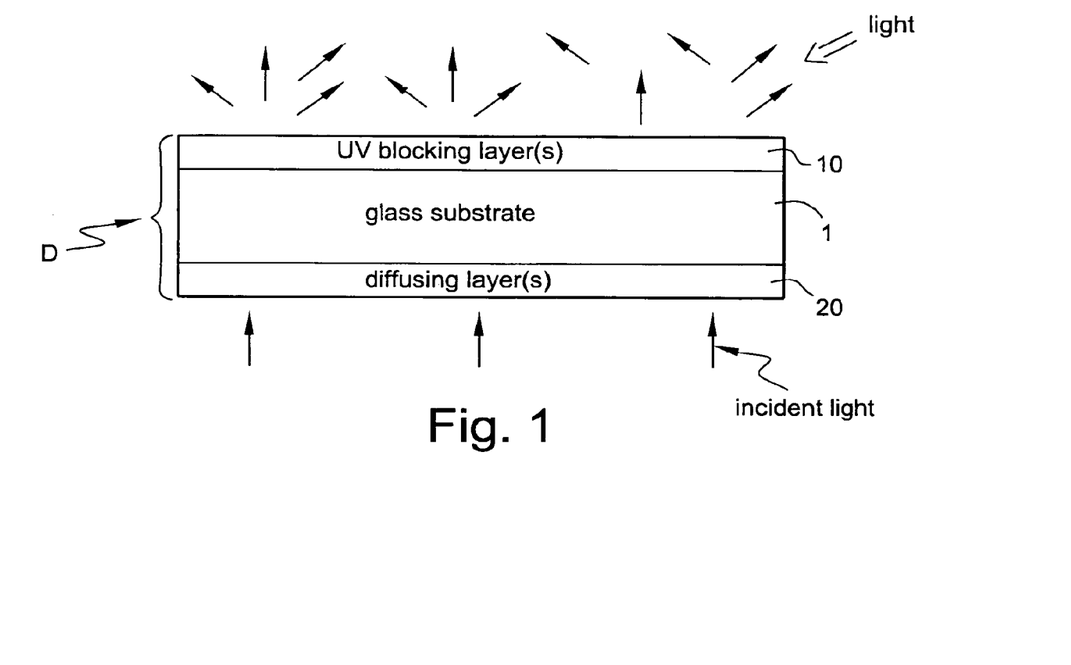
FIG. 1 is a cross sectional view of a diffuser according to an example embodiment of this invention.

FIG. 1 is cross sectional view of a diffuser D according to an example embodiment of this invention. The diffuser D of the FIG. 1 embodiment includes a glass substrate 1, a UV blocking coating 10, and a diffusing coating 20. The glass substrate 1 may be a soda-lime-silica based glass substrate according to certain example embodiments of this invention, and may or may not be heat treated (e.g., thermally tempered). Each of the coatings 10, 20 may include one or more layers in different embodiments of this invention. In the FIG. 1 embodiment, the UV blocking coating 10 functions to block significant amounts of UV radiation that was present in the incident light from the light source(s) of the illumination system, whereas the diffusing coating 20 causes the incident light to substantially spread out or scatter as it moves through the glass substrate 1. Each of the UV blocking coating 10 and the diffusing coating 20 do not block significant amounts of visible rays (e.g., no more than about 25% each, more preferably no more than about 10% each), so that efficiency of transmission of visible radiation is retained and/or maintained by the diffuser. In certain example instances, the optional diffusing coating 20 may be a coating that includes a frit composition for diffusing purposes, or may be a coating that includes a plurality of particles (e.g., particles of $TiO_2$, $Al_2O_3$, $SiO_2$ and/or the like) suspended in a solution or resin for diffusing visible light. In the FIG. 1 embodiment, the UV coating 10 and the diffusing coating 20 are on opposite major sides of the glass substrate 1. In certain instances, the coating 20 may be omitted and the UV coating 10 may include diffusing particles so as to perform the light diffusing function in addition to the UV blocking function.

Figure 2:
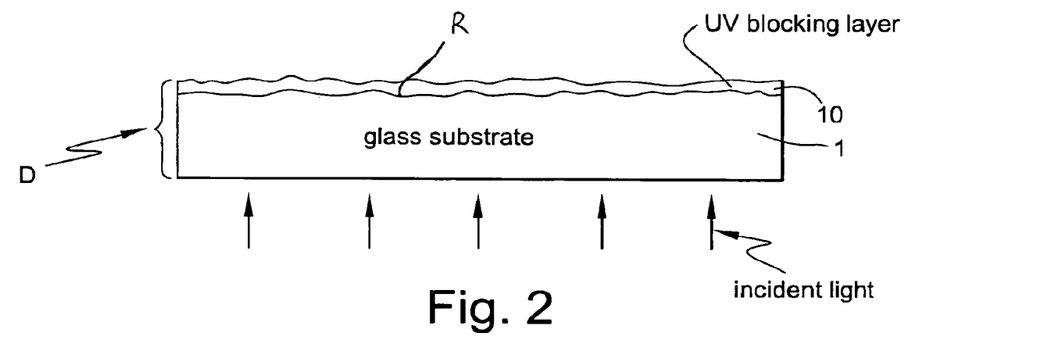
FIG. 2 is a cross sectional view of a diffuser according to another example embodiment of this invention.

FIG. 2 is a cross sectional view of a diffuser D according to another example embodiment of this invention. Like the FIG. 1 embodiment, the diffuser of FIG. 2 includes a glass substrate 1 and a UV blocking coating 10. However, in the FIG. 2 embodiment, at least one major surface of the glass substrate 1 is roughened to provide a light scattering diffusing effect. In the illustrated FIG. 2 embodiment, the surface of the glass substrate 1 under the UV blocking coating 10 has been roughened to provide a roughened surface R for scattering/ spreading visible light so that the product can function as a diffuser. The surface roughening of the glass substrate 1 may be performed in any suitable manner, including but not limited to etching of the glass using a hydrofluoric acid based solution (HF-etched glass), sand-blasting of the glass, or any other technique for etching of the glass surface. The incident light is diffused by the roughened surface R due to the differences in indices of refraction along the roughened area between the glass and the overlying coating and air. In this embodiment, the roughened surface R of the glass 1 and/or the coating 10 provides the visible light diffusing function, whereas the UV coating 10 provides the function of blocking significant amounts of UV radiation. Coating 10 may also perform a light diffusing function in certain example instances.

Figure 3:
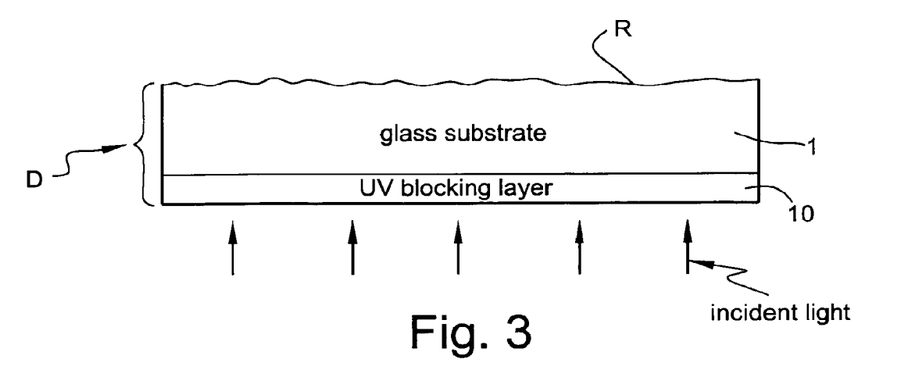
FIG. 3 is a cross sectional view of a diffuser according to yet another example embodiment of this invention.

FIG. 3 is a cross sectional view of a diffuser D according to yet another example embodiment of this invention. Like the FIG. 1 embodiment, the diffuser of FIG. 2 includes a glass substrate 1 and a UV blocking coating 10. However, in the FIG. 3 embodiment, at least one major surface of the glass substrate 1 is roughened to provide a light scattering diffusing effect. In the illustrated FIG. 3 embodiment, the front surface of the glass substrate 1 (i.e., the surface furthest from the light source(s) of the illumination system) has been roughened to provide a roughened surface R for scattering/spreading visible light so that the product can function as a diffuser. The surface roughening of the glass substrate 1 may be performed in any suitable manner, including but not limited to etching of the glass using a hydrofluoric acid based solution (HF-etched glass), sand-blasting of the glass, or any other technique for etching of the glass surface. The incident light is diffused by the roughened surface R due to the differences in indices of refraction along the roughened area between the glass and the overlying coating and air. In this FIG. 3 embodiment, the UV coating 10 is provided on the surface of the glass substrate opposite the roughened surface R. In this embodiment, the roughened surface R of the glass 1 provides the visible light diffusing function, whereas the UV coating 10 provides the function of blocking significant amounts of UV radiation. While the FIG. 3 embodiment illustrates the front surface being roughened and the rear surface of the glass substrate having the UV blocking coating 10 thereon, this invention is not so limited as the positions of the UV blocking coating 10 and the roughened surface R could be reversed in alternative embodiments of this invention. In other words, in alternative embodiments the rear surface of the glass substrate could be roughened and the UV coating 10 could be provided on the front surface of the glass substrate 1.

Figure 4:
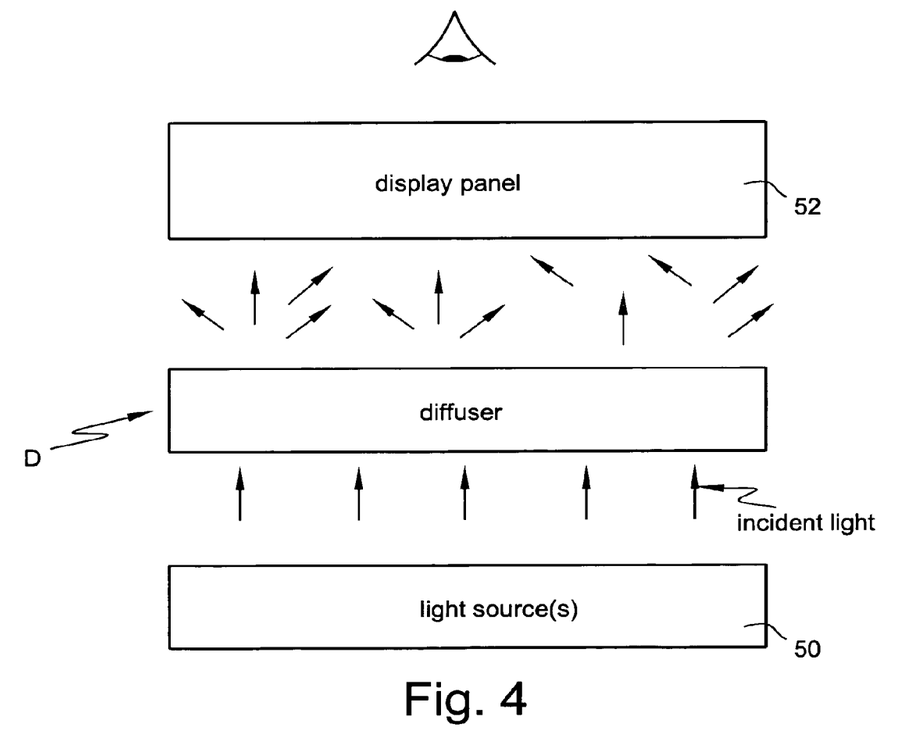
FIG. 4 is a cross sectional schematic diagram of any of the diffusers herein used in an example display application.
Figure 5:
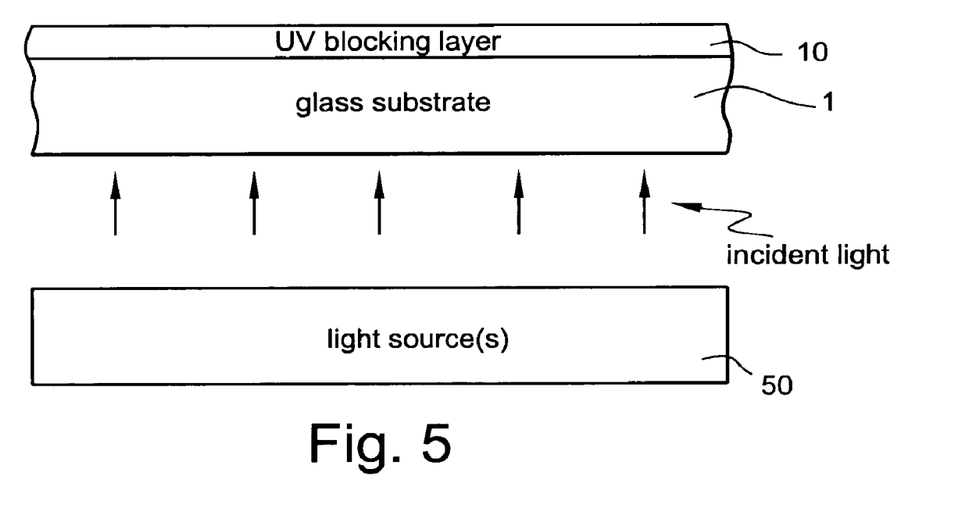
FIG. 5 is a cross sectional view of a diffuser according to another example embodiment of this invention.

FIG. 5 is a cross sectional view of a diffuser D according to still another example embodiment of this invention. In the FIG. 5 embodiment, the coating 10 provides both UV blocking functionality and visible light diffusing functionality. In other words, both the diffusing and UV blocking functions are performed by the same coating 10 in this embodiment. Stated another way, the UV coating 10 in this embodiment has been modified so that the UV coating also acts as a diffuser. This may be achieved by providing filler particulate material (s) such as silica, alumina and/or titania in the UV coating 10 with the filler particulate material acting to reflect and thus spread/scatter visible light rays passing through the coating 10. In certain example instances, particles of one or more of silica, titania, alumina, or zirconia may be mixed with radiation absorbing additives such as UV and/or IR (infrared) blockers in a compatible binder matrix material to render the resultant coating 10 an effective scatterer of visible light and blocker of damaging UV and/or IR radiation. In certain instances, the same particles may function to both block UV and diffuse light in the coating 10. It is also possible to imprint a fine pattern onto a clear coating 10 to cause it to function as a non-glare coating instead of or in addition to a diffusing coating. This coating 10 of the FIG. 5 embodiment, which functions as both a light diffuser and UV blocker, may be used in conjunction with any of the other embodiments discussed herein in certain example instances (e.g., see FIGS. 1-4).

In certain example embodiments, it is also possible to add fluorescent material(s) to the UV coating 10 of any of the embodiments discussed herein. These may be selected to absorb UV and re-emit visible light, thereby increasing efficiency of the illumination system.

Example UV blocking coatings 10, which may be used in any of the aforesaid embodiments, will now be discussed.

In certain example embodiments, UV blocking coating 10 is of or includes one or more UV blockers provided in a high temperature curable glassy matrix such as a glass inclusive frit (an Example frit is Ferro frit 20-8099 available from Ferro Corporation of Ohio). Example heat resistant UV blockers which may be mixed with the frit include inorganic oxides of one or more of Ce, Zn, Bi, Ti, Sn and/or Sb. In certain example embodiments, the UV coating 10 includes from about 0.05 to 15% of UV blocker(s) (e.g., oxide of one or more of Ce, Zn, Bi, Ti, Sn and/or Sb), more preferably from about 0.1 to 10%, even more preferably from about 0.1 to 5%, and most preferably from about 0.2 to 3%. The UV blocker(s) may or may not be provided in a suspension such as water in certain example embodiments (e.g., colloid). One or more of the aforesaid UV blocker(s) may be provided in a frit matrix in forming and making up the UV coating 10 according to certain example embodiments of this invention. Moreover, in certain example embodiments, the UV coating 10 includes at least about 80% frit, more preferably at least about 85%, even more preferably at least about 90%, and possibly at least about 95% or 97%.

In certain example embodiments the diffuser D, including at least the glass substrate 1 and UV blocking coating 10, has a $T_{UV}$ (UV transmission) of no greater than about 20%, more preferably no greater than about 10%, even more preferably no greater than about 5%, and sometimes no greater than about 3% or 2%.

In certain example embodiments of this invention, UV blocking coating 10 prevents at least about 50% of UV radiation (300-380 nm) reaching the same from passing therethrough, more preferably at least about 70%, even more preferably prevents at least about 80% of UV radiation reaching the same from passing therethrough, and most preferably prevents at least about 90% (or at least about 95%) of UV radiation reaching the same from passing therethrough. In other words, UV blocking coating 10 preferably blocks at least about 50% of UV radiation (i.e., from 300-380 nm), more preferably at least about 70% of UV radiation, even more preferably at least about 80%, more preferably at least about 90% of UV radiation, and most preferably at least 95% of UV radiation (e.g., see FIGS. 7-12). UV blocking coating 10 may block UV radiation (from 300-380 nm) by, for example and without limitation, reflecting such UV radiation, absorbing such UV radiation, and/or converting amounts of such UV radiation into other type(s) of radiation (e.g., IR), and/or the like.

In certain example embodiments, the diffuser D has a visible transmission of at least about 35%, more preferably of at least about 50%, even more preferably of at least about 60%, and sometimes at least about 70%.

In certain example embodiments of this invention, the UV blocking coating 10 may be of or include a colloidal electroconductive oxide solution having both infrared (IR) and ultraviolet (UV) blocking characteristics. In certain example embodiments of this invention, for UV blocking coating 10, a substantially transparent composite oxide coating is provided that includes a silica matrix, zinc antimonite, and a UV blocking material, thereby permitting the coating (e.g., applied via a coating sol) after application to block significant amounts of both IR and UV radiation. In certain example embodiments of this invention, a UV and IR blocking coating comprises each of cerium oxide and zinc antimonite in the form of nanoparticulate, and silicon oxide (e.g., $SiO_2$). It has surprisingly been found that such coatings are effective at blocking both UV and IR radiation, and also are resistant to high temperatures as spectral response remains substantially unchanged in certain example instances after one or two hours of substantial heating (e.g., to about 400 or 450 degrees C.). In certain example embodiments, the coated article has transmission for a wavelength of 2300 nm, of less than 10%. In certain example embodiments of this invention, the sol type coating comprises from about 15 to 50% cerium oxide (more preferably from about 20 to 45%, and most preferably from about 30 to 40%), from about 30 to 70% zinc antimonate (more preferably from about 35 to 65%, and most preferably from about 40 to 55%), and from about 5 to 35% silicon oxide (more preferably from about 10 to 30%, and most preferably from about 12 to 25%). It has been found that these amounts of such materials in the sol type coating provide a coating that is effective at blocking both UV and IR radiation, and also are resistant to high temperatures. In the case where the colloidal antimony oxide is antimony oxide sol, the method of producing electroconductive anhydrous zinc antimonate inclusive coatings according to certain example embodiments can be produced by, inter alia, mixing antimony oxide sol and a zinc compound, and then calcining the mixture at 300 to 680 degrees C. after drying. The zinc compound which can be used in certain example embodiments is at least one zinc compound selected from the group consisting of zinc hydroxide, zinc oxide, inorganic acid salts of zinc and organic salts of zinc. The inorganic acid salts of zinc include zinc carbonate, basic zinc carbonate, zinc nitrate, zinc chloride, zinc sulfate and the like. The organic acid salts of zinc include zinc formate, zinc acetate, zinc oxalate and the like. These zinc compounds may be those put on the market as industrial chemicals. When zinc hydroxide and zinc oxide are used, it is preferred that they have a primary particle diameter of 100 nm or less. In particular, the salts containing acids that vaporize upon calcination, for example, carbonate salts and organic acid salts, are preferred. They may be used alone or as admixtures of two or more of them. The colloidal antimony oxide which can be used is antimony oxide having a primary particle diameter of 100 nm or less and includes diantimony pentoxide sol, hexaantimony tridecaoxide sol, diantimony tetroxide hydrate sol, colloidal diantimony trioxide and the like. The diantimony pentoxide sol can be produced by known methods, for example, a method in which diantimony trioxide is oxidized, a method in which an alkali antimonate is dealkalized with ion exchange resin, a method in which sodium antimonate is treated with an acid, and/or the like. The hexaantimony tridecaoxide sol can be produced by a method in which diantimony trioxide is oxidized and the diantimony tetroxide hydrate sol can also be produced by a method in which diantimony trioxide is oxidized. The colloidal diantimony trioxide can be produced by a gas phase method in certain example instances.

FIG. 4 illustrates an example embodiment of this invention, where any diffuser D discussed above (e.g., see any of FIGS. 1-3 and 5) or any diffuser in an Example discussed below is used in an illumination system of a display such as a liquid crystal display. The illumination system includes a light source(s) 50 for directing collimated or non-collimated light toward the diffuser D. The light from the source(s) 50 is considered incident light on the diffuser D. The light from the source(s) 50 includes both visible and UV radiation, and possibly IR radiation. The diffuser D (see any of FIGS. 1-3 and 5) scatters/spreads the visible light from the light source (s) 50 and causes a significant amount of the UV radiation from the source(s) 50 to be blocked. Thus, the light which makes its way from the diffuser D toward the display panel 52 has less UV radiation therein and is diffuse in nature.

In certain example embodiments of this invention, the UV blocking coating 10 is from about 1 to 15 μm thick, more preferably from about 1 to 10 μm thick, and most preferably from about 2 to 8 μm thick.

EXAMPLES 1-13

Figure 6:
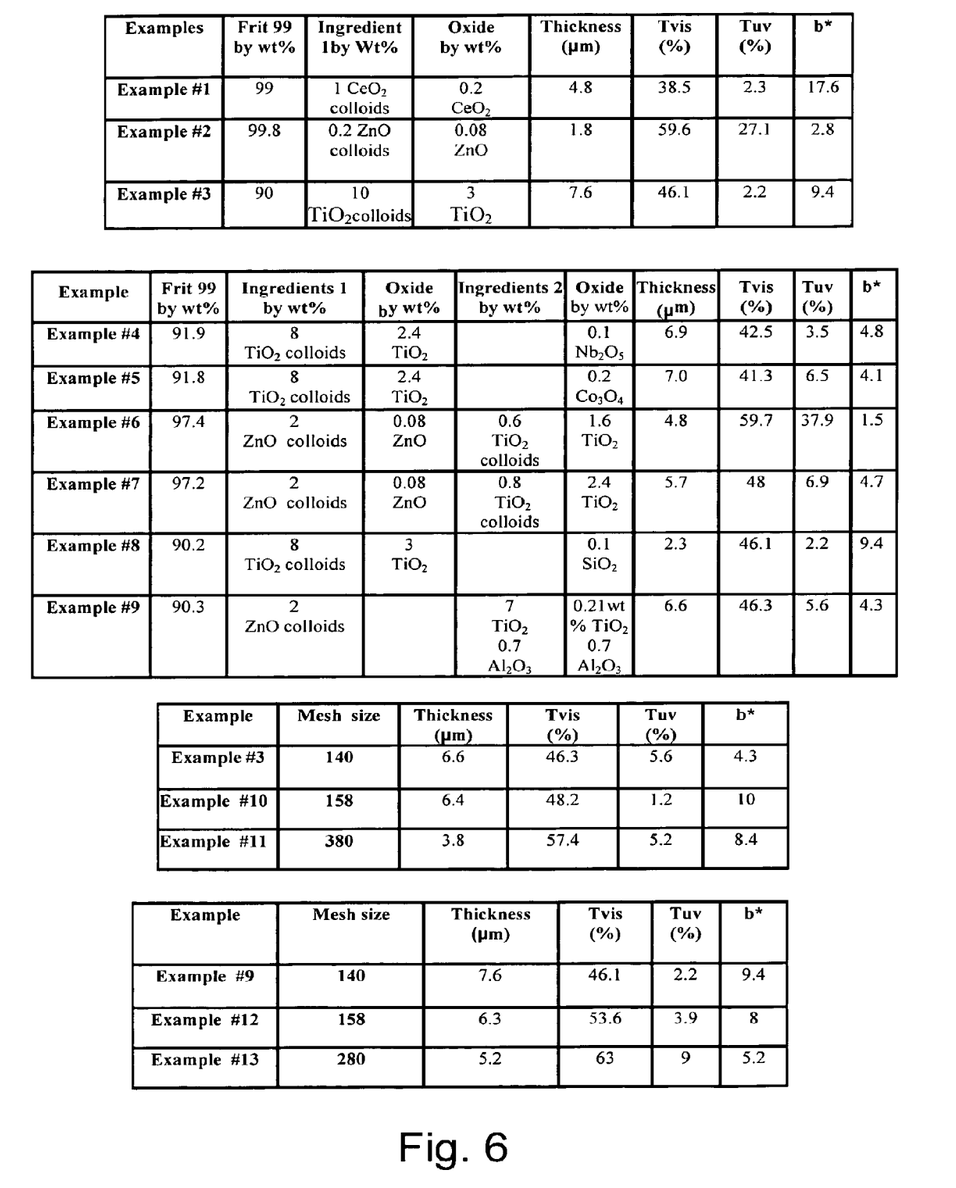
FIG. 6 illustrates the make-up of UV blocking coatings of Examples 1-13 according to different examples of the instant invention.

Examples 1-13 are for purposes of example only and without limitation. In each of Examples 1-13, a UV blocking coating 10 was formed on a flat glass substrate. FIG. 6 illustrates the make-up of the coatings 10 of Examples 1-13. In FIG. 6, "Frit 99" refers to Ferro 20-8099 glass frit, and the "thickness" refers to the thickness of the coating 10.

Figure 7:
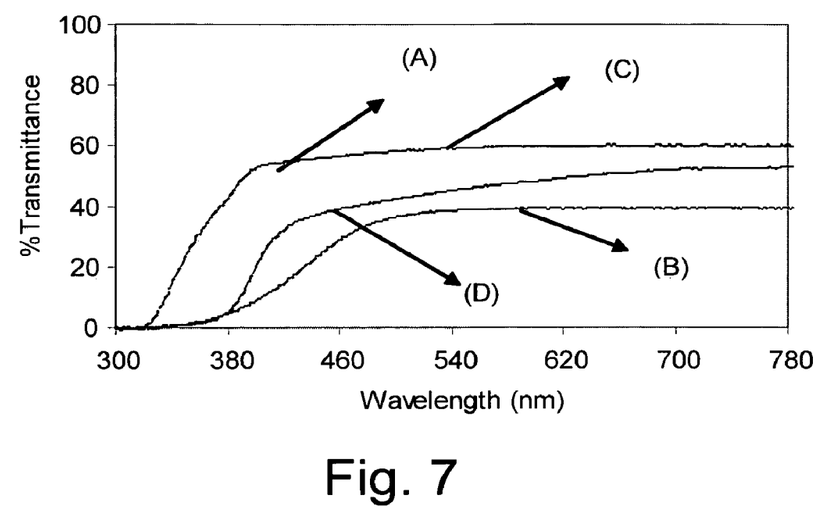
FIG. 7 is a graph illustrating the transmission vs. wavelength characteristics of Examples 1-3 (B, C and D in the figure) compared to frit alone in a coating (A in the figure).
Figure 8:
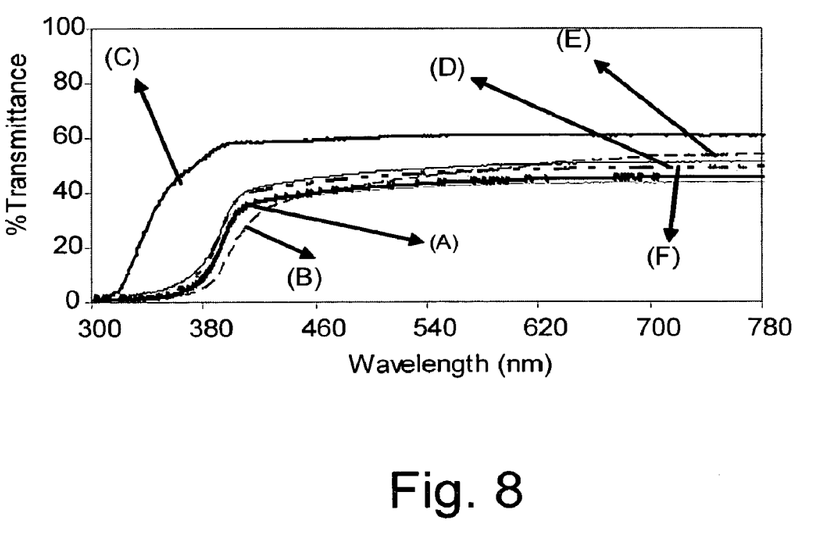
FIG. 8 is a graph illustrating the transmission vs. wavelength characteristics of Examples 4-9.

Example 1 relates to a diffuser as shown in FIG. 5. The diffuser D of Example 1 was made as follows. A composite slurry was made by mixing 99%, by weight, of Ferro 20-8099 frit (glass frit) with 1%, by weight, of a colloidal dispersion of 10-20 nm particle size cerium oxide ($CeO_2$) particles (Nyacol nano ceria) obtained from Nyacol. Nyacol supplied the dispersion of cerium oxide particles in water (i.e., the colloidal dispersion). The cerium oxide acts as a UV blocker. The UV blocking coating was applied on a 3 mm thick glass substrate 1 by using a screen printing technique using screen with a mesh size 140. The coated glass substrate was then subjected to heat treatment at about 625 degrees C. for about 5 minutes, thereby providing a thermally tempered diffuser including a glass substrate 1 with a scratch resistant UV blocking and light diffusing coating 10 thereon. The optical spectrum of the diffuser D of Example 1, including the tempered glass substrate 1 and UV blocking/diffusive coating 10, is shown by curve (B) in FIG. 7, and the diffuser had a Tuv of about 2.3% and a $T_{vis}$ of about 38.5%. For purpose of comparison, curve (A) in FIG. 7 illustrates a Comparative Example diffuser with a glass substrate and a coating of only Ferro 20-8099 frit (with no UV blocker in the coating) prepared under the same conditions. It can be seen that the diffuser of Example 1 ((B) in FIG. 7) had a much better (lower) transmission in the UV range (i.e., from 300-380 nm) compared to the Comparative Example ((A) in FIG. 7). Moreover, the Comparative Example diffuser, with no cerium oxide in the coating, had a Tuv of about 22.3% and a $T_{vis}$ of about 57.3%.

Example 2 relates to a diffuser as shown in FIG. 5. The diffuser D of Example 2 was made as follows. A composite slurry was made by mixing 99.8%, by weight, of Ferro 20-8099 frit (glass frit) with 0.2%, by weight, of a colloidal dispersion of 20-40 nm particle size zinc oxide (ZnO) particles (Nano Z) obtained from Buhler. The casting method and heat treatment were the same as in Example 1, with the glass substrate being the same thickness. The optical spectrum of the diffuser D of Example 2, including the tempered glass substrate 1 and coating 10, is shown by curve (C) in FIG. 7, and the diffuser had a Tuv of about 27.1% and a $T_{vis}$ of about 59.6%. For purpose of comparison, curve (A) in FIG. 7 illustrates a Comparative Example diffuser with a glass substrate and a coating of only Ferro 20-8099 frit (with no ZnO in the coating) prepared under the same conditions. The Comparative Example diffuser, with no zinc oxide in the coating, had a Tuv of about 22.3% and a $T_{vis}$ of about 57.3%. Thus, it will be appreciated that the zinc oxide particles in the coating of Example 2 did not result in any improvement in UV blockage.

Example 3 relates to a diffuser as shown in FIG. 5. The diffuser D of Example 3 was made as follows. A composite slurry was made by mixing 90%, by weight, of Ferro 20-8099 frit (glass frit) with 10%, by weight, of a colloidal dispersion of 280 nm particle size titanium oxide (e.g., TiO$_2$) particles obtained from Elementis. The titanium oxide acts as a UV blocker. The UV blocking coating was applied on a 3 mm thick glass substrate 1 by using a screen printing technique using screen with a mesh size 140. The coated glass substrate was then subjected to heat treatment at about 625 degrees C. for about 5 minutes, thereby providing a thermally tempered diffuser including a glass substrate 1 with a scratch resistant UV blocking and light diffusing coating 10 thereon. The optical spectrum of the diffuser D of Example 3, including the tempered glass substrate 1 and UV blocking/diffusive coating 10, is shown by curve (D) in FIG. 7, and the diffuser had a Tuv of about 2.2% and a $T_{vis}$ of about 46.1%. By comparing Example 3 ((D) in FIG. 7) with the Comparative Example (A) in FIG. 7), it can be seen that the diffuser of Example 3 had a much better (lower) transmission in the UV range (i.e., from 300-380 nm) compared to the Comparative Example.

Example 4 relates to a diffuser as shown in FIG. 5. The diffuser D of Example 4 was made as follows. A composite slurry was made by mixing 91.9%, by weight, of Ferro 20-8099 frit with about 8%, by weight, of a colloidal dispersion of 280 nm particle size titanium oxide (e.g., TiO$_2$) particles obtained from Elementis, and 0.1% by weight of 1 μm niobium pentaoxide particles obtained from Aldrich. The UV blocking coating 10 was applied on a 3 mm thick glass substrate 1. The casting method and heat treatment were the same as in Example 1. The optical spectrum of the diffuser D of Example 4, including the tempered glass substrate 1 and UV blocking/diffusive coating 10, is shown by curve (A) in FIG. 8, and the diffuser had a Tuv of about 3.5% and a $T_{vis}$ of about 42.5%.

Example 5 relates to a diffuser as shown in FIG. 5. The diffuser D of Example 5 was made as follows. Example 5 was the same as Example 4, except that the niobium pentaoxide was replaced with about 0.2%, by weight, of 1 μm cobalt oxide particles obtained from Aldrich. The optical spectrum of the diffuser D of Example 5, including the tempered glass substrate 1 and UV blocking/diffusive coating 10, is shown by curve (B) in FIG. 8, and the diffuser had a Tuv of about 6.5% and a $T_{vis}$ of about 41.3%.

Example 6 relates to a diffuser as shown in FIG. 5. The diffuser D of Example 6 was made as follows. A composite slurry was made by mixing 97.4%, by weight, of Ferro 20-8099 frit with about 2%, by weight, of a colloidal dispersion of 20-40 nm particle size zinc oxide particles obtained from Buhler, and 0.6% by weight of colloidal dispersion of 280 nm titanium oxide particles obtained from Elementis. The coating was applied on a 3 mm thick glass substrate 1. The casting method and heat treatment were the same as in Example 1. The optical spectrum of the diffuser D of Example 6 is shown by curve (C) in FIG. 8, and the diffuser had a Tuv of about 37.9% and a $T_{vis}$ of about 59.7%. Again, it can be seen that the zinc oxide did not block much UV.

Example 7 relates to a diffuser as shown in FIG. 5. The diffuser D of Example 7 was made as follows. Example 7 was the same as Example 6, except that there was selectively changed the weight percentage of colloidal dispersion of 280 nm titania to 0.8%. The optical spectrum of the diffuser D of Example 7 is shown by curve (D) in FIG. 8, and the diffuser (including the glass and UV blocking coating) had a Tuv of about 6.9% and a $T_{vis}$ of about 48%. It can be seen that the small increase in titania, compared to Example 6, resulted in a much improved (lower) UV transmission.

Example 8 relates to a diffuser as shown in FIG. 5. The diffuser D of Example 8 was made as follows. A composite slurry was made by mixing about 90%, by weight, of Ferro 20-8099 frit with about 8%, by weight, of a colloidal dispersion of 280 nm particle size titanium oxide (e.g., TiO$_2$) particles, and 0.1% by weight of 4-10 μm silicon dioxide particles (TS 100) obtained from Degussa. The UV blocking coating 10 was applied on a 3 mm thick glass substrate 1. The casting method and heat treatment were the same as in Example 1. The optical spectrum of the diffuser D of Example 8, including the tempered glass substrate 1 and UV blocking/diffusive coating 10, is shown by curve (E) in FIG. 8, and the diffuser had a Tuv of about 2.2% and a $T_{vis}$ of about 46.1%.

Example 9 relates to a diffuser as shown in FIG. 5. The diffuser D of Example 9 was made as follows. A composite slurry was made by mixing about 90.3%, by weight, of Ferro 20-8099 frit with about 2%, by weight, of a colloidal dispersion of 20-40 nm particle size zinc oxide particles, 7% colloidal dispersion of 280 nm titanium oxide particles, and 0.7% by weight of 10 μm aluminum oxide particles obtained from Aldrich. The UV blocking coating 10 was applied on a 3 mm thick glass substrate 1. The casting method and heat treatment were the same as in Example 1. The optical spectrum of the diffuser D of Example 9, including the tempered glass substrate 1 and UV blocking/diffusive coating 10, is shown by curve (F) in FIG. 8, and the diffuser had a $T_{UV}$ of about 5.6% and a $T_{vis}$ of about 46.3%.

Figure 9:
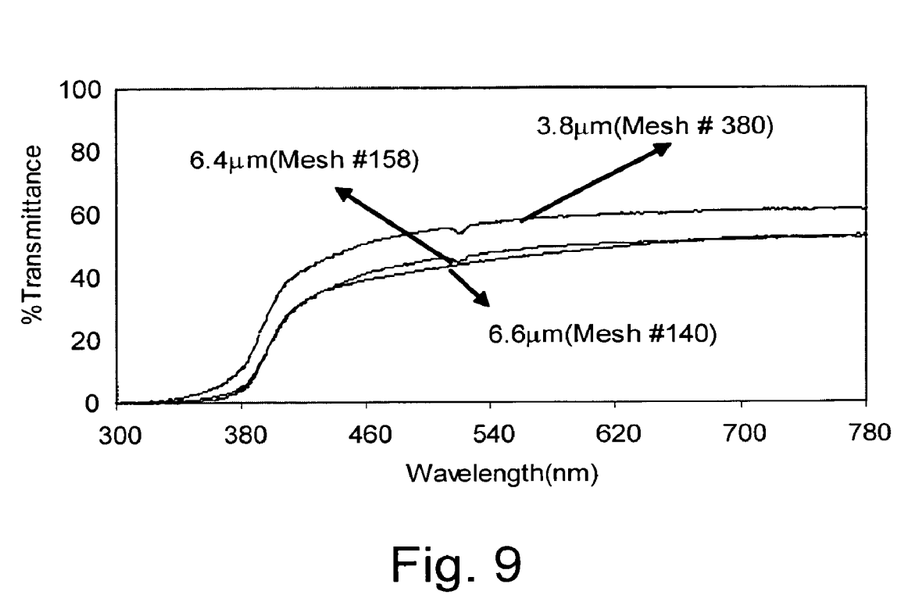
FIG. 9 is a graph illustrating the effect of UV blocking coating thickness on transmission vs. wavelength characteristics, using UV coatings of Examples 3, 10 and 11 (the curves in FIG. 9 are representative of Examples 3, 10 and 11, respectively).
Figure 10:
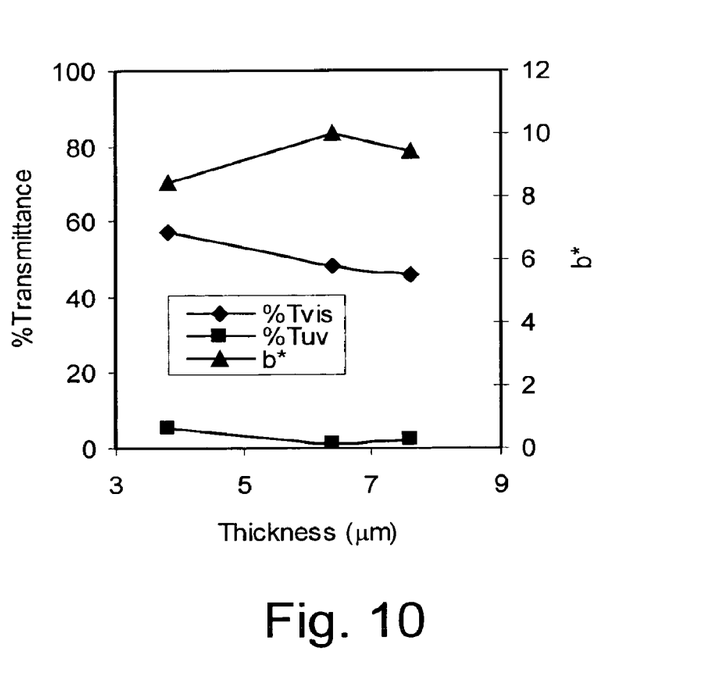
FIG. 10 is a graph illustrating the effect of UV blocking coating thickness on transmission characteristics, using a UV coating material having the makeup of Example 3.

Example 10 is the same as Example 3, except that the screen with mesh size 140 was replaced with a screen with mesh size 158. The optical spectrum of the diffuser D of Example 10, including the tempered glass substrate 1 and UV blocking/diffusive coating 10, is shown in FIG. 9, and the diffuser had a Tuv of about 1.2% and a $T_{vis}$ of about 48.2%. FIG. 9 illustrates different mesh sizes for screens, and the results thereof on transmission in visible and UV spectrums. In particular, the curves in FIG. 9 are representative of Examples 3, 10 and 11.

Example 11 is the same as Example 3, except that the screen with mesh size 140 was replaced with a screen with mesh size 380. The optical spectrum of the diffuser D of Example 11, including the tempered glass substrate 1 and UV blocking/diffusive coating 10, is shown in FIG. 9, and the diffuser had a Tuv of about 5.2% and a $T_{vis}$ of about 57.4%. FIG. 9 illustrates different mesh sizes for screens, and the results thereof on transmission in visible and UV spectrums. In particular, the curves in FIG. 9 are representative of Examples 3, 10 and 11. FIG. 9 shows that larger mesh number sizes resulted in higher visible transmission characteristics, with the highest mesh size also resulting in a higher UV transmission in certain areas.

Figure 11:
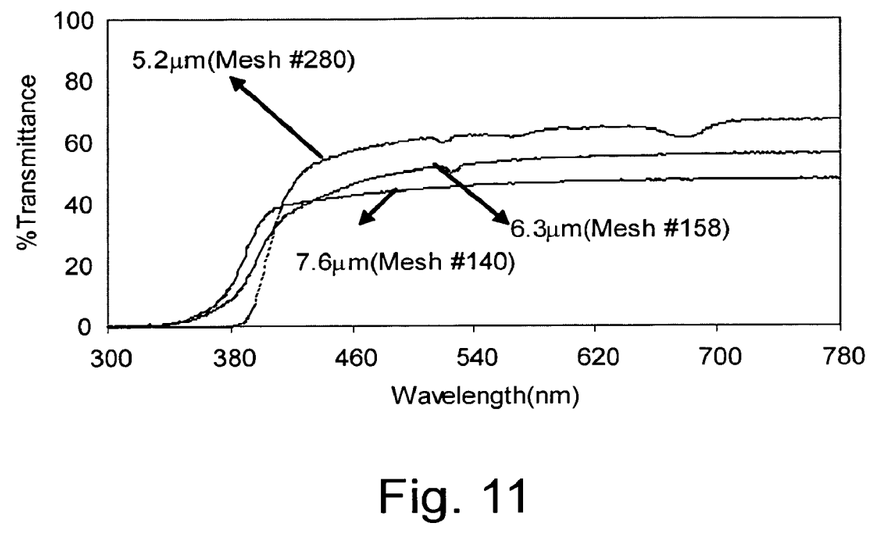
FIG. 11 is a graph illustrating the effect of UV blocking coating thickness on transmission vs. wavelength characteristics, using a UV coating material having the makeup of Example 9 (the curves in FIG. 11 are representative of Examples 9, 12 and 13, respectively).
Figure 12:
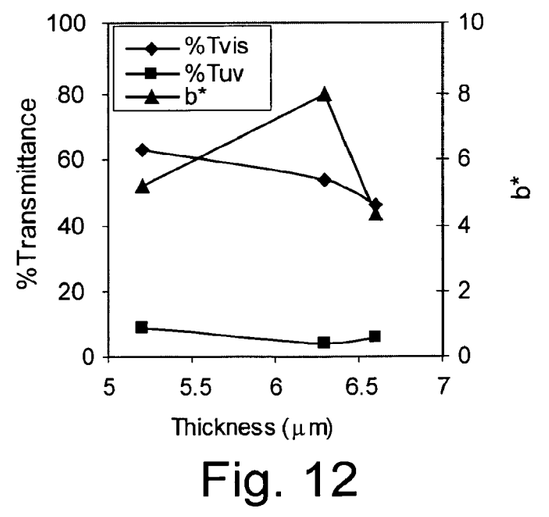
FIG. 12 is a graph illustrating the effect of UV blocking coating thickness on transmission characteristics, using a UV coating material having the makeup of Example 9.

Example 12 is the same as Example 9, except that the screen with mesh size 140 was replaced with a screen with mesh size 158. The optical spectrum of the diffuser D of Example 12, including the tempered glass substrate 1 and UV blocking/diffusive coating 10, is shown in FIG. 11 (see mesh size 158 curve in FIG. 11), and the diffuser had a Tuv of about 3.9% and a $T_{vis}$ of about 53.6%. FIG. 11 illustrates different mesh sizes for screens, and the results thereof on transmission in visible and UV spectrums. In particular, the curves in FIG. 11 are representative of Examples 9, 12 and 13.

Example 13 is the same as Example 12, except that the screen with mesh size 140 was replaced with a screen with mesh size 280. The optical spectrum of the diffuser D of Example 13, including the tempered glass substrate 1 and UV blocking/diffusive coating 10, is shown in FIG. 11 (see mesh size 280 curve in FIG. 11), and the diffuser had a Tuv of about 9% and a $T_{vis}$ of about 63%. Thus, FIG. 11 illustrates the effect of screen mesh size on the thickness of the coating 10 and the optical properties of the coatings containing 90.3% frit, 2% zinc colloids, 7% titania colloids, and 0.7% alumina powder.

It is noted that the coatings 10 of Examples 1-13 contain additives that both scatter light and fluoresce in the presence of UV radiation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An illumination system comprising:
    a light source for emitting light, the light emitted from the light source including at least visible light and ultraviolet (UV) radiation;
    a diffuser positioned so as to receive light from the light source, the diffuser diffusing visible light received from the light source; and
    wherein the diffuser comprises a glass substrate that supports a UV blocking coating, so that the diffuser has a $T_{uv}$ (UV transmission) of no greater than about 20%, and wherein the UV blocking coating comprises inorganic oxide(s) of one or more of Ce, Zn, Bi, Ti, Sn and Sb in a glass frit, and wherein the UV blocking coating comprises silicon oxide: from about 5-35%. cerium oxide: from about 10-50%, and zinc antimonate: from about 30-70%.

2. The illumination system of claim 1, wherein the UV blocking coating comprises, by weight, from about 0.1 to 10% of the inorganic oxide(s) of one or more of Ce, Bi, Ti, Sn and Sb.

3. The illumination system of claim 1, wherein the UV blocking coating comprises, by weight, from about 0.1 to 5% of the inorganic oxide(s) of one or more of Ce, Bi, Ti, Sn and Sb.

4. The illumination system of claim 1, wherein the UV blocking coating comprises, by weight, from about 1 to 5% of the inorganic oxide(s) of one or more of Ce, Bi, Ti, Sn and Sb.

5. The illumination system of claim 1, wherein the UV blocking coating comprises, by weight, at least about 80% flit.

6. The illumination system of claim 1, wherein the diffuser has a $T_{uv}$ of no greater than about 10%.

7. The illumination system of claim 1, wherein the diffuser has a $T_{uv}$ of no greater than about 5%.

8. The illumination system of claim 1, wherein the diffuser has a $T_{uv}$ of no greater than about 3%.

9. The illumination system of claim 1, wherein the UV blocking coating is in direct contact with the glass substrate.

10. The illumination system of claim 1, wherein the glass substrate is thermally tempered.

11. The illumination system of claim 1, wherein the diffuser has a transmission at 325 nm of less than 15.

12. The illumination system of claim 1, wherein the diffuser has a visible transmission of at least about 35%.

13. The illumination system of claim 1, wherein the UV blocking coating contains no or substantially no organic material.

14. An optical diffuser for use in an illumination system, the optical diffuser comprising:
    a glass substrate that supports a UV blocking coating,
    wherein the diffuser has a $T_{uv}$ (UV transmission) of no greater than about 20%, and wherein the UV blocking coating comprises at least one inorganic metal oxide for blocking significant amounts of UV radiation, and wherein the at least one inorganic metal oxide is provided in a fl-it, and wherein the UV blocking coating comprises silicon oxide: from about 5-35%, cerium oxide: from about 10-50%, and zinc antimonate: from about 30-70%.

15. The diffuser of claim 14, wherein the UV blocking coating comprises, by weight, from about 0.1 to 10% of the inorganic oxide(s) of one or more of Ce, Bi, Ti, Sn and Sb.

16. The diffuser of claim 14, wherein the diffuser has a $T_{uv}$ of no greater than about 5%.

17. The diffuser of claim 14, wherein the glass substrate is thermally tempered.

18. The diffuser of claim 14, wherein the UV blocking coating comprises at least one of: (a) cerium oxide: from about 10-50%, and (b) zinc antimonate: from about 30-70%.

19. The diffuser of claim 14, wherein the diffuser has a visible transmission of at least about 35%.

* * * * *